(No Model.)
T. P. CONLON.
BEER MULLER.
No. 416,442. Patented Dec. 3, 1889.
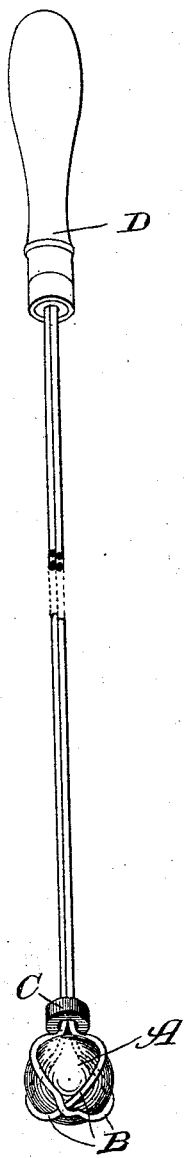
Witnesses:
Chas. E. Gaylord,
Clifford N. White.
Inventor:
Thomas P. Conlon,
By Banning & Banning & Payson
Attys

UNITED STATES PATENT OFFICE.

THOMAS P. CONLON, OF CHICAGO, ILLINOIS.

BEER-MULLER.

SPECIFICATION forming part of Letters Patent No. 416,442, dated December 3, 1889.

Application filed June 25, 1889. Serial No. 315,533. (No model.)

*To all whom it may concern:*

Be it known that I, THOMAS P. CONLON, a citizen of the United States, residing at Chicago, Illinois, have invented certain new and useful Improvements in Beer - Mullers, of which the following is a specification.

When beer is drawn from a keg or other receptacle in which it is kept in the refrigerator or cooling-room, it is often, particularly in the winter-time, very cold, so that it is desirable to heat it in a glass before drinking it. Customers also often desire to have their beer heated, even when it is of moderate temperature. This has usually been done by inserting the end of a red-hot poker or other similar instrument into the glass and stirring it through the beer. This operation is what is termed "mulling" the beer.

To make a convenient device or instrument for use in mulling beer, wine, or other beverages is the object of my invention.

The drawing represents a perspective view of my improved beer-muller.

In making my improved mulling device in the way which I prefer I make a ball A, of steel, cast-iron, or other suitable material, of about the size of an ounce minnie-ball. It may, however, be larger and of any suitable size and shape, as round, multisided, or square. I inclose this ball in a guard of wires B, which are bent into proper shape to incircle it and retain it in place. These wires may be brought together and held by a collar C immediately above the ball, so that the ball will be inclosed and retained in its guard or cage of wires. The wires may extend out from the collar a suitable distance—say one foot—and terminate in an enlarged end D, to enable the device to be easily handled.

The ball will be prevented by the wires from coming into contact with the bottom or sides of the glass, and the wires being much smaller than the ball will be immediately cooled on being inserted into the glass of beer, and will so prevent breakage, which is liable to occur when the ball itself, which takes some time to cool, actually rubs against the glass. The effect on the beer itself will of course be the same, whether the guards of wire be employed or not.

In operation the ball is heated by putting it into any convenient fire until it is red-hot or even hotter. The glass of beer is then drawn off and the ball inserted, and the beer thoroughly stirred with the same until it has attained the desired degree of heat, or has become "mulled," as it is usually called.

What I regard as new, and desire to secure by Letters Patent, is—

In a device for mulling beer, the combination of a ball capable of being heated, an inclosing guard or cage of wires to prevent the ball from coming into contact with the glass, and a handle for moving the ball about in the glass of beer, substantially as described.

THOMAS P. CONLON.

Witnesses:
 THOMAS A. BANNING,
 EPHRAIM BANNING.